Figure 1:
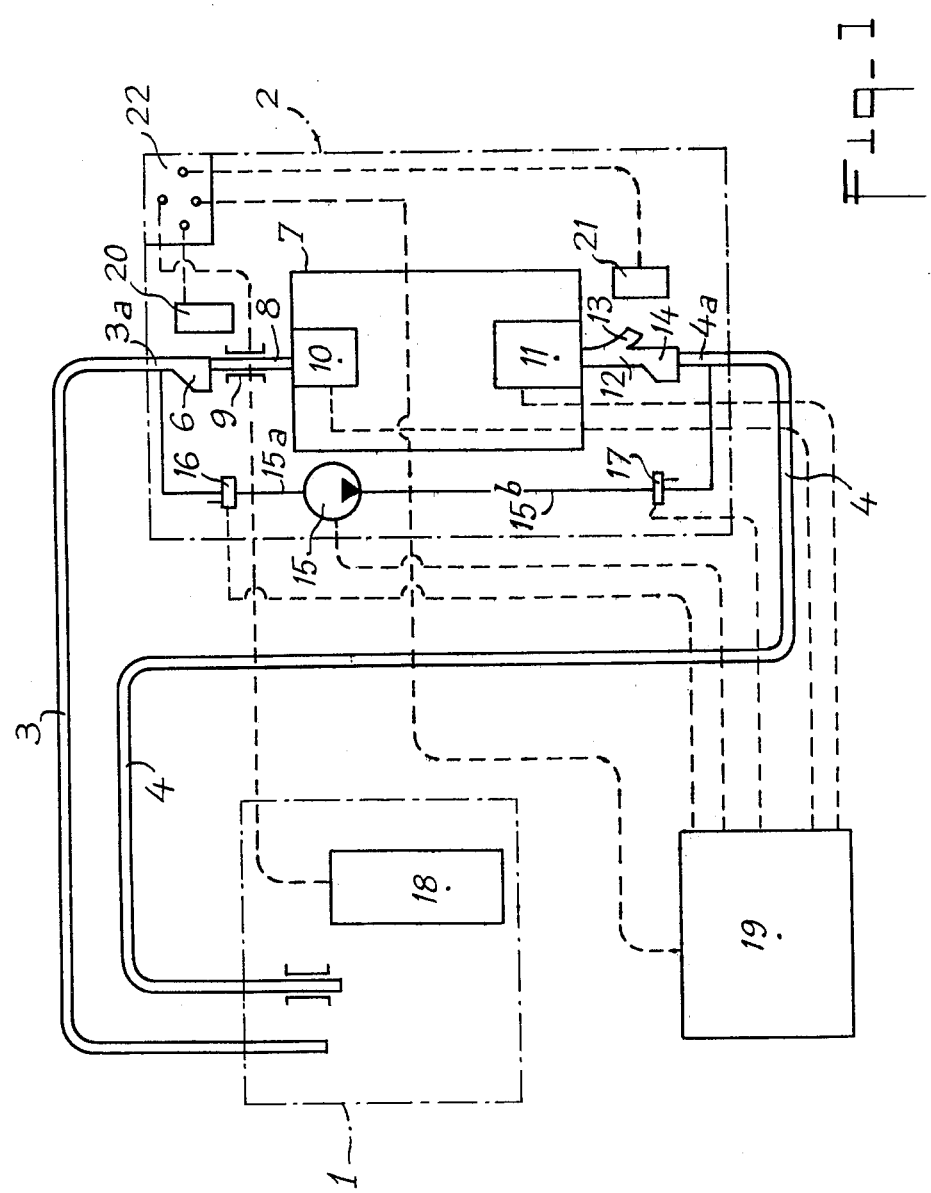

United States Patent [19]

Thibonnier et al.

[11] 4,239,420
[45] Dec. 16, 1980

[54] INSTALLATION FOR THE AUTOMATIC AND ACCOUNTED STORAGE AND DISTRIBUTION OF CASH

[75] Inventors: Jacques Thibonnier, Fontenay-sous-Bois; Pierre-René Douard, Versailles; Jean M. L. Thepot, Paris, all of France

[73] Assignee: Compagnie due Roneo and Fluidelec, Paris, France

[21] Appl. No.: 971,236

[22] Filed: Dec. 20, 1978

[30] Foreign Application Priority Data

Dec. 29, 1977 [FR] France .................. 77 39702

[51] Int. Cl.³ .............................................. B65G 51/40
[52] U.S. Cl. ........................................ 406/2; 406/34; 406/110; 406/192
[58] Field of Search ............... 406/1, 2, 16, 17, 18, 406/19, 21, 22, 34, 110, 117, 155, 183, 192; 186/1 BA

[56] References Cited

U.S. PATENT DOCUMENTS

| 992,223 | 5/1911 | MacLaren | 406/110 X |
| 1,776,697 | 9/1930 | McGuinness et al. | 406/192 |
| 4,059,246 | 11/1977 | Anders et al. | 406/110 X |

FOREIGN PATENT DOCUMENTS 1107598 5/1961 Fed. Rep. of Germany.
1560541 2/1969 France.

*Primary Examiner*—Jeffrey V. Nase
*Attorney, Agent, or Firm*—Lewis H. Eslinger

[57] ABSTRACT

An installation for the transfer of cash between a cash desk and a strong room in a banking establishment includes a conveying line, a storage device, a removal line and a blower which is selectively connected to the conveying line, the storage device and the removal line through a logic control unit located at a desk. The "driving" members of the installation are situated in the strong room.

7 Claims, 5 Drawing Figures

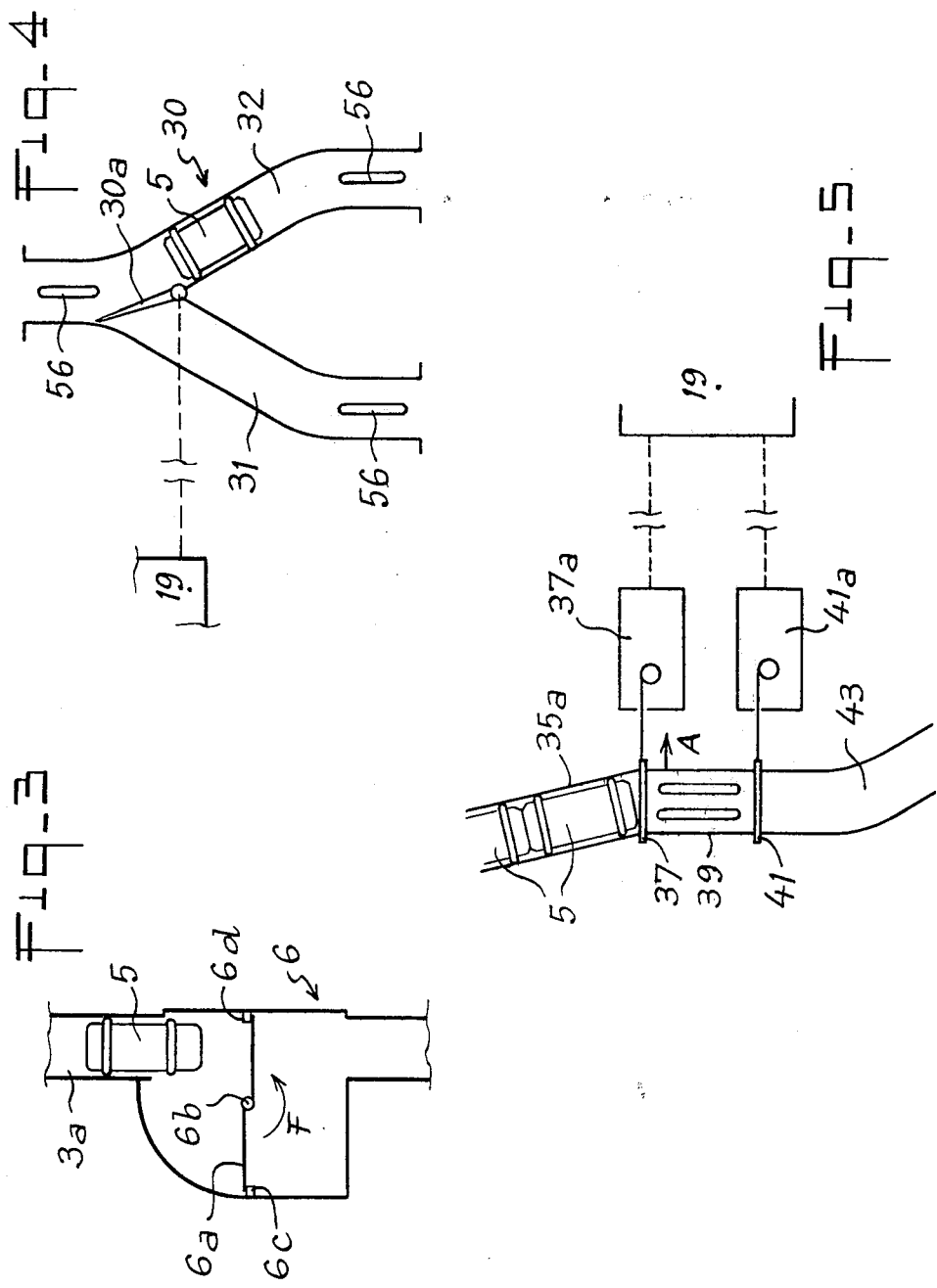

INSTALLATION FOR THE AUTOMATIC AND ACCOUNTED STORAGE AND DISTRIBUTION OF CASH

The object of the present invention is an installation for transferring cash with a minimum of handling, hence with a maximum security, between, for example, the counter and the strong room in a banking establishment.

The problem arising has two main aspects. The first aspect resides in the security of the transport of the cash on the actual premises of a banking establishment. Indeed, cash is most vulnerable when being transported back and forth between the strong room and the cash desk or counter of the bank. The problem therefore is to reduce this vulnerability and the automation of the transfer is a reduction factor. It is further necessary, also for reasons of security, to ensure that there is a minimum of cash at the cash desk and a maximum in the strong room. This requirement means frequent movements between the desk and the strong room and small quantities of cash being moved. An automation of the transfer is perfectly suitable for these frequent movements.

Such frequent movements of cash however, raise an accounting difficulty, and this is the second aspect of the problem to be solved. Indeed, banks are required to keep up a day-to-day account of the contents of their strong room. Thereagain, with the automation of the transfers and the selective storage of the cash according to the invention, accounting can be made automatic.

To this effect and in order to increase to a maximum the security of cash transfers inside a banking establishment, the invention is concerned with an installation for the automatic and accounted storage and distribution of cash between a cash inlet/outlet unit and a cash storage unit forming a strong room.

According to the invention, such installation comprises:
a plurality of cartridges, substantially cylindrical in shape, which can be loaded with a predetermined quantity of cash, and forming a container for conveying and storing the said cash,
a tubular assembly extending between the inlet-outlet unit and the strong room comprising:
a conveying line for conveying the cartridges from the inlet-outlet unit to the strong room,
a cartridge removal line connecting the strong room to the inlet-outlet unit,
at least one blowing system situated in the strong room whose suction tube is selectively connected to the conveying line and to the atmosphere and whose delivery tube is selectively connected to the atmosphere and to the removal line.
a valve mechanism mounted at the end of each of the aforesaid lines and inside the strong room and which makes it possible to pneumatically isolate the said lines from the strong room whilst letting the cartridges through,
a cartridge storage device connecting in the strong room, the conveying line to the removal line between the aforesaid valve mechanisms, and being provided with means for conveying the cartridges,
a logic device consisting of a central unit whose inlet is connected to at least one control desk situated in the inlet-outlet unit and whose outlet is connected to the blowing system and to the conveying means provided in the storage device,
an accounting device comprising a reversible counter, connected to the inlet and to the outlet of the storage device.

In one embodiment of the invention, the storage device is composed, from the valve mechanism of the conveying line, by a vertical switching device wherein the cartridges can move by gravity from a common inlet tube to one tube from a plurality of outlet tubes, selected from the central control unit, by means of internal direction points, each of the said tubes comprising a valve means for pneumatically isolating it from the tube which extends from it belonging to a cartridge storage tube system, the inlet to each tube being adapted so as to be connected individually and selectively to the delivery channel of the aforesaid blowing system by a means for sensing the passage of a cartridge through its inlet, each tube being provided at its end with a substantially vertical portion at the base of which is placed a retractable stopping plate, which constitutes a cartridge holding and releasing means, controlled by the said central unit, whereas beyond the said plate, each of the said tubes is extended by a perforated tubular guide, of substantially the same height as a cartridge, sealed across its lower part by a second retractable stopping plate, the said guide constituting the inlet to each tube in a convergent collector system whose single outlet is connected to the valve mechanism provided in the removal line, the end portion of the said outlet being adapted so as to be connected to the suction channel of the said blowing system when the said second plate is retracted.

In a simplified version of the invention, the cartridge storage tube system may consist of only one tube.

Figure 2:
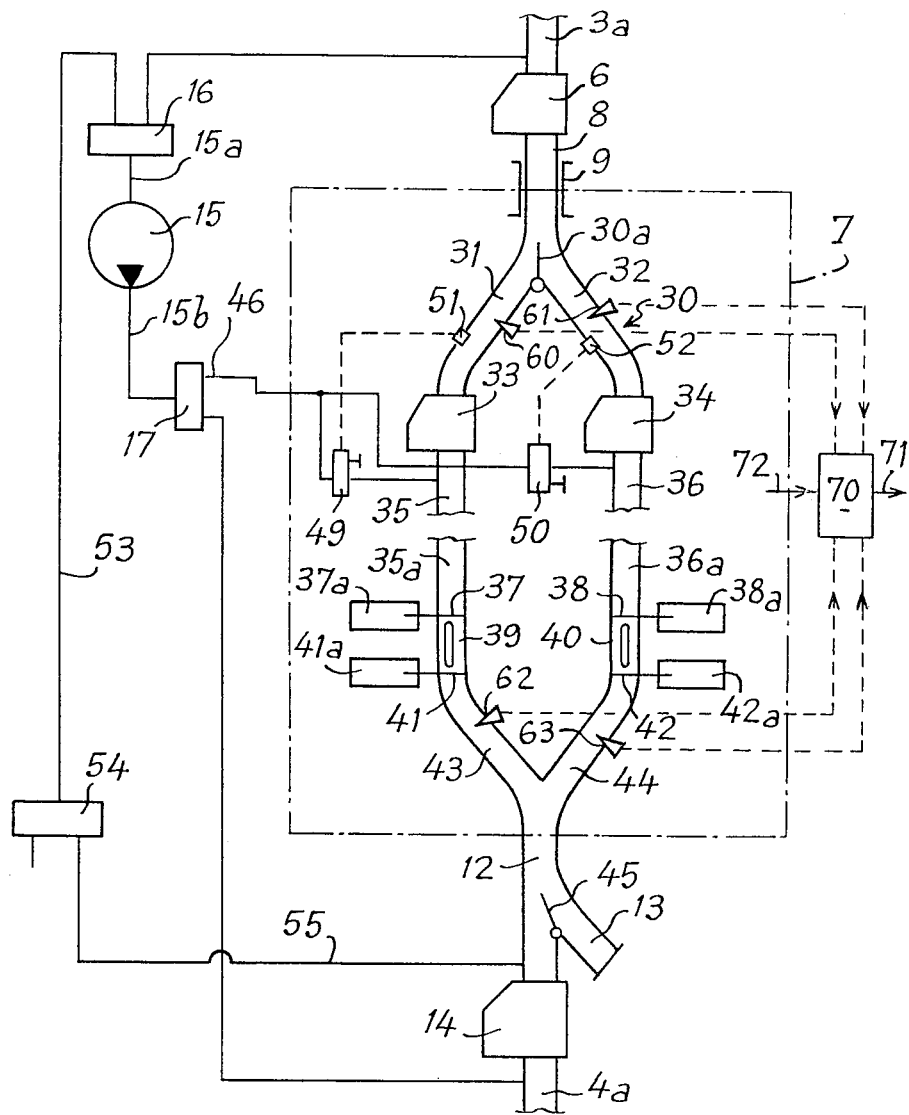

The invention will be more readily understood and other characteristics and advantages will become clear on reading the following description, given by way of example and non-restrictively, reference being made to the accompanying drawings in which:

FIG. 1 is a simplified diagram showing the installation according to the invention;

FIG. 2 diagrammatically shows the design of a two-line selective storage device, used in the equipment according to the invention;

FIG. 3 shows a diagram of a valve mechanism such as used in the present invention, FIG. 4 is a diagram of the switching device used in the installation of FIG. 2, FIG. 5 diagrammatically illustrates the connection between the end of a storing tube and the tube collector system.

Referring first to FIG. 1, this shows an installation according to the invention, which extends between a cash outlet station 1, such as for example, the cash desk in a bank, and a storage unit 2 for said cash which will be the strong room of the banking establishment. This installation comprises a cash conveying line 3, going from station 1 to unit 2 and a cash removal line 4 taking said cash from unit 2 to station 1. The cash is contained in cartridges 5 (see FIGS. 3, 4 and 5) substantially cylindrical in shape so as to be able to slide in the installation. Said cartridges contain predetermined values of money which "customize" them so that they can be stored selectively in the strong room on separate lines depending on said values. The selective storage will be explained in more detail with reference to FIG. 2.

The end 3a of the conveying line 3 is situated inside the strong room 2 and is equipped with a valve mechanism 6 which makes it possible to isolate pneumatically the said line from the part of installation situated downstream of the said mechanism whilst allowing the arrival of a cartridge 5 in 3a, to continue its travel towards the said part of installation. The principle of this valve mechanism, which is known per se, is illustrated in FIG. 3 from which it is seen that the said mechanism comprises a flap 6a pivotally mounted in 6b and provided with a resilient member around its axis so as to return it along f in sealed abutment against the bearings 6c and 6d. Said valve isolates the tube 3a from the part of installation which is situated downstream if a depression prevails in this tube. The arrival of a cartridge 5 in the mechanism 6, causes the flap 6a to rotate, by means of its kinetic energy, and said cartridge then reaches the lower connection of the mechanism. The flap thereafter closes back under the effect of the return member.

The outlet of the valve mechanism 6 is connected to a storage device 7 by means of an inlet tube 8, which inlet tube is provided with a side opening which may be closed off by a sliding sleeve 9 and which allows the passage of cartridges, at this level, into the installation. The device 7 comprises a selecting or switching mechanism symbolized in 10 and a collector mechanism 11 which will be described in detail with reference to FIG. 2.

At the outlet of the storage device, there is a single outlet tube 12 which is provided with a branch 13, which branch makes it possible to retrieve released cartridges from the strong room. The tube 12 is connected to a mechanism 14, similar to the one 6 described hereinabove. The mechanism 14 is connected to the end 4a, of the removal line 4, which end is situated inside the strong room, the said mechanism isolating the said line from the tube 12 whenever an excess of pressure prevails therein.

The suction channel 15a of a blower 15 is adapted, to be connected, by means of a valve 16, either to the strong room, or to the said part 3a, and the delivery pipe 15b of the said blower is adapted to be connected, by means of a valve 17, either to the said part 4a, or to the atmosphere.

Finally, the installation according to the invention is provided with a logic device for controlling its operation and comprising a main desk 18, situated in the station 1, a central unit 19, a secondary inlet desk 20 situated in the strong room and a secondary outlet desk 21, also situated in the strong room.

The inlet part of the central unit also receives the desks 18, 20 or 21 depending on the selected position of a selector 22 situated in the strong room and which makes it possible to select manually which desk to be put in operation, with the exclusion of the other two. The outlet of the central unit is connected to the blower 15 and its valves 16 and 17 to the storage device 7 (and in particular to the selecting mechanism 10 and and collector 11 of said latter) and to a switching device for setting the branch 13 into or out of operation.

FIG. 2 illustrates a storage device 7, comprising two tracks for facilitating the explanation. This device can, according to the principle of the invention, comprise any number of tracks. A specific value, corresponding to the cartridge cash value which can be received and stored, is affected to each track. FIG. 2 also shows a number of the already described elements, with the same references.

The tube 8 is connected to a switching device 30, constituted by a tube system (consisting here of two divergent tubes 31 and 32). A needle 30a is pivotally mounted at the junction of two tubes, which needle can, by means of a driving member, not shown and controlled by the central unit 19, constitute a guide means for the passage of a cartridge from the tube 8 either towards the tube 31, or towards the tube 32 depending on the position taken in answer to the aforesaid control means. These tubes 31 and 32 are situated in a substantially vertical plane. They have at their lower end a valve 33, 34 similar to the one 6 described hereinabove (FIG. 3). The outlet of each one of these valves is connected to a tube 35, 36 which belongs to a storage tube system which can have any shape, depending in particular on the volume available in the strong room for storage.

The other end 35a, 36a of these tubes is designed in a substantially vertical plane so as to form vertical columns of stored cartridges.

The member provided for holding the cartridges at the base of these columns is a transversal plate 37, 38 which is retractable by means of driving members 37a, 38a, controlled by the central unit 19.

Beyond these plates, each tube in the aforesaid tube system is extended by a perforated tubular enclosure 39, 40 substantially equal in length to the cartridge. Said enclosures are each closed off at their base by retractable plates 41, 42, similar to those 37, 38 described hereinabove, retractable by means of driving members 41a, 42a, controlled by the central unit 19.

Each perforated enclosure is then connected beyond the said second plates to the single outlet tube 12 described with reference to FIG. 1, by means of a collector system of convergent tubes 43, 44. At the connection of the tubes 12 and 13, a needle 45, is provided which is similar to needle 30a and similarly controlled by the central unit 19, for setting the branch 13 into or out of operation.

In the vicinity of the valve mechanism 33 and 34, the tubes 35 and 36 are connected to the delivery pipe 15b of the blower 15 by means of a conduit 46, issued from the valve 17 and connected to each one of the tubes 35, 36 by means of obturators 49, 50. The valve 17 is connected to the central control unit whereas the obturators 49, 50 are set in such a position as to open the conduits going through them by means of contact points 51 and 52, when these are actuated by a cartridge passing at their level, i.e. immediately before (or after) the valves 33, 34. The suction pipe 15a of the blower 15 is connected, at the level of the valve, to a conduit 53 which comprises a valve 54 controlled by the central unit 19, which valve permits the connection of the conduit 53 either with the atmosphere, or with a conduit 55 connected to the tube 12 in the vicinity of the valve mechanism 14.

FIG. 4 shows the switching device 30 fitted with its needle 30a. It is noted that said device is provided in the wall of the tubes with perforations 56 so that the cartridge 5, when circulating in this device, is not retained by any compressions or depressions of the air contained in the said device.

Finally, the FIG. 5 shows on a larger scale, the end 35a of the tube 35 comprising cartridges 5 stacked up and held in position by the retractable plate 37. It is to be noted that the said end 35a is slightly inclined on the plate 37, so as to make an obtuse angle with the retracting direction A of the said plate. This arrangement has the following advantage. When the plate 37 is retracted, a cartridge 5 falls on the plate 41 in the enclosure 39.

The following cartridge 5 thus rests on the cartridge situated in the enclosure, in one point, because of their different gradients. The adjacent end planes of these cartridges form an angle open on the side of the retracted plate 37, thereby allowing the easy introduction of the plate when said latter is no longer retracted, and an easy separation of the lower cartridge from the rest of the column contained in the tube 35.

The installation according to the invention operates as follows. Supposing that the cashier wishes to store a cartridge 5 in the strong room, he selects and displays on the desk 18 the value of the cartridge to be stored, thereby defining what storage line will receive it. His order, sent to the central unit 19, is transmitted by said latter to the needle 30a which tilts so as for example to form a guide for the cartridge between the tube 8 and the tube 31. At the same time, the valves 16 and 17 are actuated so that, on the one hand, a suction occurs in the line 3 and an expulsion in the conduit 46 which comprises a calibrated delivery valve, not shown.

The blower 15 is then set into operation, either by the unit 19 with a certain time-delay, or by a switch not shown, provided at the inlet of the line 3 and actuated when the cartridge is fitted in. The cartridge is sucked right through line 3 up to the valve 6. The cartridge then crosses the said valve 6 and slides, by kinetic energy and gravity, along the tube 8 and the tube 31. On its way, the said cartridge actuates the switch 51 which opens a way through the conduit 46 and the tube 35. By gravity, the cartridge crosses the valve 33 and is then taken over by the air flow expelled through conduit 35, which air flow propels it until it comes in abutment behind the last cartridge of the column contained in the end 35a of the said tube. Vent-holes, judiciously provided and closable is necessary, are placed on that last part 35a so as to avoid or to control the formation of air cushions meeting up with the cartridge at the end of its travel and also to expel the compressed air from the storage tubes.

The cartridge is then stored and the unit 19 receives the information thereof and controls the switching off of the installation.

The cashier now wants to obtain a cartridge of a definite value. He selects and displays the said value on the desk 18, which value is interpreted by the central unit 19 which then controls the retraction of plate 38 for example. A cartridge falls on plate 42 and the plate 38 is returned to its initial position in order to separate said cartridge from the rest of the column. After this sequence, the plate 42 is retracted whilst the blower is set in operation and the tube 12 is connected with its suction 15a, by means of valves 16 and 54. At the same time, the end 4a of the removal line is connected with the delivery pipe 15b of the blower by means of valve 17.

The cartridge is sucked in along tube 44 and tube 12 (the needle 45 being in the position of closing the branch 13) and then goes through the valve 14 to be propelled into the line 4 by the air flow discharged therein by the blower. The cash end of the line 4 is provided with a side opening and with a sliding sleeve, allowing the cashier, in known manner, to reach and to remove the cartridge.

A storage of cartridges may have to be done from the strong room, in the case for example of an outside arrival of cash. Then an operator actuates the selector 22 which cuts off the connection between the desk 18 and the central unit 19 and sets the secondary desk 20 into operation. The read-outs are then done from said latter, via the central unit, and the cartridges are introduced at the level of tube 8 via the sleeve 9, the control operations effected by the central unit being, at the outlet, identical to those described hereinabove.

Similarly, it is possible to use the branch 13 when cash needs to be taken out of the bank. From the selector 22, the operator then sets the secondary desk 21 into operation. This is accompanied by an automatic control of the needle 45 in the position wherein the cartridges are deviated towards the branch 13. The removal of the cash then takes place as previously indicated.

It is clear that in the installation according to the invention, the driving members in the transfer of funds are placed in the strong room which is a security factor of this installation since the access to these members is not direct.

This installation also lends itself to the fitting of alarm devices or of devices for controlling the transfer of the cartridges throughout their travel path, either by means of switches connected to standard timers, or by constant measurement of the blower outputs.

It is also easy to imagine a simplified version of the invention, which would comprise only one storing line. This version is obtained in FIG. 2 by removing the needle 30a from the way 32 to 44 with all the elements attached thereto and by removing the obturator 50 and the conduit branch 46 on which it is fitted.

Finally the invention makes it possible to fit easily a reversible counter device, provided with sensors, at the inlet of tubes 35 and 36 and at the inlet of tubes 43 and 44, said sensors being connected to a reversible counting logical unit provided with a display device in the strong room and with means for duplicating this display in different parts of the bank.

Such an accounting device has been diagrammatically illustrated in FIG. 2. Each one of tubes 35 and 36 is provided with a sensor 60, 61 which, when a cartridge passes, sends an information to a logical unit of reversible counting 70, which unit stores the value attributed to each storage line. This information is processed by the said unit so as to update by addition the amount of money stored. In the same way, the sensors 62, 63 provided on the tubes 43, 44 send an information to the unit 70 whenever a cartridge passes in the tubes. The unit processes this information by substracting it from the amount of cash stored. The result 71 of these operations may be transmitted to terminal stations not shown.

It should further be noted that the installation according to the invention can comprise one line only, for example for small bank establishments. In this case, the storage may be done by cartridges of different values. An additional inlet 72 is then provided in the accounting unit 70 permitting the manual introduction of the value of the stored cartridge and that of the released cartridge.

The invention finds an interesting application in the fitting of establishments handling money and precious or valuable articles.

It is conceivable, without departing from the scope of the invention, to vary the installation described, for example in the pneumatic equipment which could include two blowers, one for conveying and storage, the other for removal, the first one to be more powerful than the other. In such a case, the first blower ensures the conveying by suction and the storage by expulsion, the second blower then ensuring a suction in the collector part and an expulsion in the removal line.

What is claimed is:

1. An installation for the automatic and accounted storage and distribution of cash between an inlet-outlet unit and a unit for storing said cash and forming strong room, which installation comprises:
- a plurality of cartridges, substantially cylindrical in shape, which can be loaded with a predetermined quantity of cash, and forming a container for conveying and storing the said cash,
- a tubular assembly extending between the inlet-outlet unit and the strong room comprising:
  - a conveying line for conveying the cartridges from the inlet-outlet unit to the strong room,
  - a cartridge removal line connecting the strong room to the inlet-outlet unit,
  - at least one blowing system situated in the strong room whose suction tube is selectively connected to the conveying line and to the atmosphere and whose delivery tube is selectively connected to the atmosphere and to the removal line,
  - a valve mechanism mounted at the end of each of the aforesaid lines and inside the strong room and which makes it possible to pneumatically isolate the said lines from the strong room whilst letting the cartridges through,
- a cartridge storage device connecting in the strong room, the conveying line to the removal line between the aforesaid valve mechanism, and being provided with means for conveying the cartridges,
- a logic device of a central unit whose inlet is connected to at least one control desk situated in the inlet-outlet unit and whose outlet is connected to the blowing system and to the conveying means provided in the storage device,
- an accounting device comprising a reversible counter, connected to the inlet and to the outlet of the storage device.

2. An installation as claimed in claim 1, wherein a secondary inlet is provided in the strong room between the valve mechanism of the conveying line and the storage device, and a secondary outlet is provided between the storage device and the valve mechanism of the removal line.

3. An installation as claimed in claim 1 wherein the storage device is composed, from the valve mechanism of the conveying line, by a vertical switching device wherein the cartridges can move by gravity from a common inlet tube to one tube from a plurality of outlet tubes, selected from the central control unit, by means of internal direction points, each of the said tubes comprising a valve means for pneumatically isolating it from the tube which extends from it belonging to a cartridge storage tube system, the inlet to each tube being adapted so as to be connected individually and selectively to the delivery channel of the aforesaid blowing system by a means for sensing the passage of a cartridge through its inlet, each tube being provided at its end with a substantially vertical portion at the base of which is placed a retractable stopping plate, which constitutes a cartridge holding and releasing means, controlled by the said central unit, whereas beyond the said plate, each of the said tubes is extended by a perforated tubular guide, of substantially the same height as a cartridge, sealed across its lower part by a second retractable stopping plate, the said guide constituting the inlet to each tube in a convergent collector system whose single outlet is connected to the valve mechanism provided in the removal line, the end portion of the said outlet being adapted so as to be connected to the suction channel of the said blowing system when the said second plate is retracted.

4. An installation as claimed in claim 3 wherein the end part of each tube of the said tube system is inclined in such a way as to form an obtuse angle with the direction of retraction of the first plate.

5. An installation as claimed in claim 3, wherein the strong chamber contains an inlet and an outlet for secondary cartridges, the said secondary inlet being a side opening in the inlet tube of the switching device, which opening may be closed by a sliding sleeve whereas the secondary outlet is constituted by a branch of the single outlet provided in the collector system, which branch is set into operation by means of an internal needle.

6. An installation as claimed in claim 1, wherein the conveying line and storage tube system are connected to a first blower.

7. An installation as claimed in claim 1, wherein the storage device is constituted, from the valve mechanism of the conveying line, by a vertical tube in which the cartridges move by gravity, a valve mechanism being mounted at its lower end to isolate it from a storage tube extending from it, the said storage tube being adapted so as to be connected to the delivery pipe of the blower by means of a sensor means, sensing each cartridge passing through its inlet, the end part of said tube being substantially vertical and being provided at its base with a retractable closing plate which constitutes a holding and releasing member for the cartridges, and which is controlled by the said central unit, whilst beyond the said plate, the said tube is extended by a perforated tubular guide of substantially equal in height to a cartridge, closed across its lower part by a second retractable closing plate, said guide being connected to the valve mechanism provided on the removal line, the end part of the said outlet being adapted so as to be connected to the suction pipe of the said blower when the said second plate is being retracted.

* * * * *